United States Patent [19]

Griffis

[11] 4,061,949

[45] Dec. 6, 1977

[54] EARTH EXCAVATOR INCLUDING APPARATUS FOR STABILIZING PERFORMANCE BY COMPENSATING FOR CHANGES IN TEMPERATURE

[75] Inventor: Daniel L. Griffis, Erie, Pa.

[73] Assignee: General Electric Company, Schenectady, N.Y.

[21] Appl. No.: 632,556

[22] Filed: Nov. 17, 1975

[51] Int. Cl.² ............................................. H02P 5/26
[52] U.S. Cl. ................................... 318/154; 318/151; 318/341; 318/471; 318/473
[58] Field of Search ............... 318/341, 334, 471, 472, 318/473, 634, 151, 152, 153, 154, 158; 322/28

[56] References Cited

U.S. PATENT DOCUMENTS

| 2,659,852 | 11/1953 | Trevitt | 318/473 |
|---|---|---|---|
| 2,776,397 | 1/1957 | McWilliams | 318/334 |
| 3,378,753 | 4/1968 | Poppinger et al. | 322/28 |
| 3,381,199 | 4/1968 | Persson | 318/334 |
| 3,396,323 | 8/1968 | Auld | 318/334 |
| 3,590,365 | 6/1971 | Nelson | 318/471 |
| 3,783,360 | 1/1974 | Bundy | 318/341 |
| 3,896,359 | 7/1975 | Olander et al. | 318/471 |

FOREIGN PATENT DOCUMENTS

| 1,570,008 | 6/1969 | France | 318/334 |

*Primary Examiner*—Robert K. Schaefer
*Assistant Examiner*—Eugene S. Indyk
*Attorney, Agent, or Firm*—Vale P. Myles

[57] ABSTRACT

An earth excavator including apparatus for stabilizing performance by compensating for changes in temperature. The apparatus includes a temperature compensating voltage regulator for regulating and controlling the output voltage of an exciting generator as a function of sensed temperature. The exciting generator supplies field excitation voltage and current to electric motors in the earth excavator. In order to maintain substantially constant current through the motor field windings with variations in temperature of the windings, and therefore to maintain the performance of the motors and thus of the excavator substantially constant with variations in temperature, the exciting generator output voltage is regulated in a manner such that the regulated voltage supplied by the exciting generator is a direct function of the temperature of the motor field windings. The output voltage of the exciting generator is controlled by controlling the average current through the exciting generator field winding. In order to produce a signal representative of motor field winding temperature, the temperature of a representative motor field winding, or of the exciting generator field winding, or of an element having a temperature which is representative of motor field winding temperature is sensed.

8 Claims, 8 Drawing Figures

CONNECTION FOR SELF-EXCITED

CONNECTION FOR SEPARATELY-EXCITED

EARTH EXCAVATOR INCLUDING APPARATUS FOR STABILIZING PERFORMANCE BY COMPENSATING FOR CHANGES IN TEMPERATURE

BACKGROUND OF THE INVENTION

1. Field of the Invention

The present invention relates to an earth excavator. More particularly, the invention relates to an earth excavator including means for stabilizing performance by compensating for variations in temperature.

2. Description of the Prior Art

In large earth excavators of the dragline or shovel type such as are used in mining operations, or in large earth-boring drills, a number of electric motors are included to provide motive power. One or a plurality of relatively large generators are also provided to supply electric current to the armatures of the various motors. Additionally, a relatively small DC generator, known as an exciter or exciting generator, is normally mounted on the equipment to supply constant field or excitation current to the field windings of the various motors. All of the generators are typically driven by a single prime mover which may be an AC electric motor supplied by commercial AC power lines, an internal combustion engine, or any other suitable power source. Each of the generators, including the exciting generator, may be combined, in a well-known manner, with an AC electric motor to form a motor-generator set.

An earth excavator is typically operated under widely varying ambient temperature conditions, which may range from −40° C. to +40° C. The performance of the motors and thus of the excavator is adversely affected by these extreme variations in temperature, as will now be explained. The electrical resistance of the various motor field windings varies with winding temperature. Decreases and increases in winding resistance with variations in temperature result in corresponding increases and decreases in motor field winding current and corresponding increases and decreases in power output and torque available from the various motors and thus variations in performance of the excavator. Absent appropriate temperature compensation for the drive motors, an operator of the excavator must learn to compensate for these variations in performance of the excavator. In general, he will be aware that at relatively low temperatures the motors develop their greatest torque. He must also know that the torque developed by some of the drive motors at low temperatures may exceed the strength of various structural members of the excavator in which the motors are used and could cause breakage thereof unless the operator promptly recognizes and compensates for such excessive torque.

Prior art attempts to deal with the problem of variations in performance of an excavator with variations in temperature include the provision of one or more auxiliary field windings in its exciting generator and the incorporation of one or more large negative temperature coefficient thermistors electrically connected in series with the auxiliary field windings and physically located in proximity thereto in order to sense the temperature thereof. With such an arrangement, as the sensed temperature of the exciting generator field windings decreases, an increase in resistance of the associated thermistor causes a decrease in field current through the exciting generator field windings. This causes a corresponding decrease in output voltage from the exciting generator armature and thus a decrease in voltage supplied to the motor field windings.

One design difficulty presented by such thermistor circuits involves the selection of a suitable location for the high wattage thermistors that are used. Since it is desired to compensate for changes in resistance of the motor field windings, caused by changes in motor field winding temperature, a theoretically optimum location for the thermistors would appear to be near a motor field winding. However, in practice it has been found, when other factors are considered, that location of the thermistors near the exciting generator field winding is a better compromise. For one thing, it is usually much easier to locate the thermistors physically near the field winding they are electrically connected in series with. For another, it is primarily changes in performance with ambient temperature that are to be compensated for and the temperature of the exciting generator and the temperature of the motors are likely to be affected similarly by changes in ambient temperature. Thus, the exciting generator field winding and the motor field winding rise in temperature during normal operation of the equipment at much the same rate. Additionally, if the thermistors were to be placed near a motor field winding, a choice would have to be made of which motor to use, since there may be several motors in the equipment, and this choice may itself require a compromise.

The use of large thermistors in this manner, while providing some degree of temperature compensation, is not completely satisfactory for a number of reasons. Even the highest-wattage thermistor available is often not really large enough and may have excessive internal heating when utilized as indicated. Adjustable high-wattage resistors are required to be connected both in series and parallel with the thermistors in order to provide adequate adjustment, and these resistors require elaborate mountings and protection means to shield personnel from the heat developed and from possible electric shock. Moreover, it is very difficult to adjust an excavator including large thermistors to achieve a satisfactory exciting generator output voltage versus field winding temperature characteristic.

A further disadvantage of such prior art excavators including large temperature compensating thermistors is that, while a degree of temperature compensation is achieved, there is no actual regulation of the output voltage from the exciting generator. Changes in electrical loading of the exciting generator or changes in rotational velocity at which the exciting generator is mechanically driven result in adverse variations in exciting generator output voltage.

Besides the foregoing operating difficulties, the manufacturing expense associated with such prior art temperature compensating arrangements is undesirably high. In a typical large excavator as many as eight thermistors and associated high-wattage resistors may be required to approach adequate compensation. Such thermistors now cost in excess of $40.00 each.

SUMMARY OF THE INVENTION

It is therefore an object of the invention to provide an improved earth excavator which includes apparatus for compensating for variations in performance caused by variations in temperature.

Another object of the invention is to provide an earth excavator including a voltage regulator for a DC exciting generator which supplies motor field winding current so that the regulated output voltage of the generator varies with temperature.

Still another object of the invention is to obviate the need for an auxiliary field winding for providing temperature compensation in an earth excavator exciting generator.

A further object of the invention is to eliminate the need for a number of expensive, high-wattage thermistors for providing temperature compensation in an earth excavator exciting generator.

It is another object of the invention to provide a temperature compensating voltage regulator which can be used to control the output voltage of either an earth excavator exciting generator of the type for which field excitation voltage and current is derived from the exciting generator output (self-excited) or an earth excavator exciting generator of the type for which a separate source of field excitation voltage and current is provided (separately-excited).

These and other objects are accomplished by the invention which provides an earth excavator including apparatus for stabilizing performance by regulating the output voltage of a DC exciting generator in a manner such that the regulated voltage supplied by the exciting generator to the field windings of various motors in the earth excavator varies as a direct function of the temperature of the motor field windings. Even though the electrical resistance of the motor field windings varies with temperature, the current through the motor field windings is maintained substantially constant, thereby maintaining the performance of the motors, and thus of the excavator, substantially constant despite variations in motor field winding temperature. Control of exciting generator output voltage is achieved by controlling the current supplied to a field winding of the exciting generator. A temperature compensating voltage regulator is provided which has a first input connected to receive a voltage feedback signal representative of the output voltage of the exciting generator, a second input connected to receive an output signal from a temperature sensing means, and an output connected to supply current to the exciting generator field winding. Current is supplied to the exciting generator field winding as an inverse function of the exciting generator output voltage and as a direct function of sensed temperature. The temperature sensing means may be physically located to sense the temperature of any element having a temperature representative of motor field winding temperature.

Additionally, in order to permit the voltage regulator to be used with self-excited exciting generators, as well as with separately-excited exciting generators, a relay can be provided in some embodiments of the invention to connect the exciting generator field winding directly across the exciting generator output during output voltage build-up.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

Figure 1:
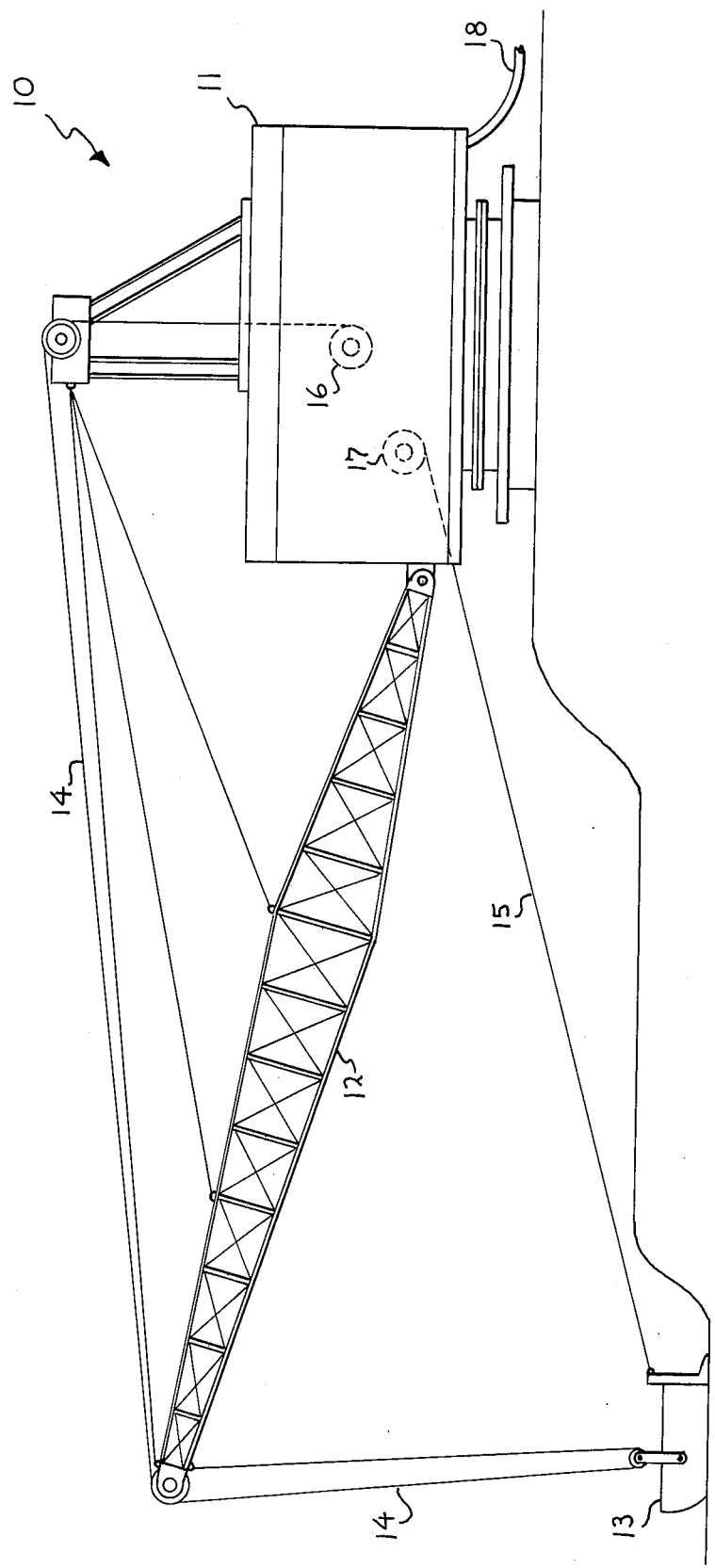
FIG. 1 is a side view in elevation of a dragline earth excavator incorporating one embodiment of the present invention.

Referring first to FIG. 1, there is shown an earth excavator, such as a dragline 10, situated adjacent a dig site. The dragline 10 includes a machinery house 11 containing generators and motors. The dragline 10 also includes a boom 12, a bucket 13 supported by a hoist cable 14 and pulled by a drag cable 15, a motor-driven hoist cable winding drum 16, and a motor-driven drag cable winding drum 17. An electrical cable 18 connects the dragline 10 to a commercial AC power line (not shown). The performance of the dragline 10 is subject to undersirable variations responsive to variations in temperature, therefore, apparatus, hereinafter described in greater detail, is included in it to stabilize performance by compensating for variations in temperature.

Figure 2:
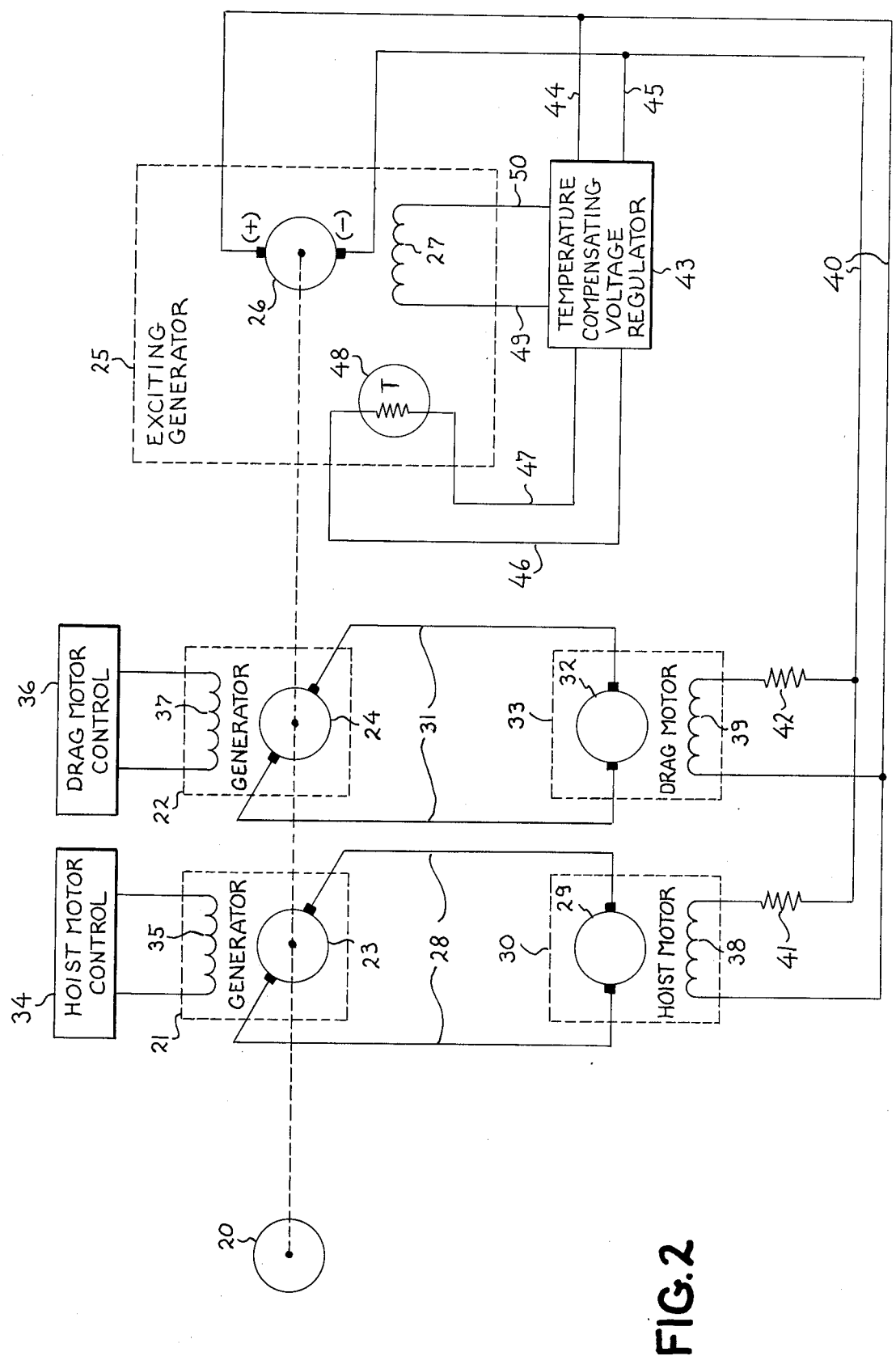
FIG. 2 is a partially schematic block diagram showing an overview including generators and motors for the dragline earth excavator shown in FIG. 1.

Referring now to FIG. 2, there is illustrated in greater detail some of the equipment, including motors and generators, contained within the machinery house 11 (shown in FIG. 1). A prime mover 20 is mechanically coupled to drive rotary generators 21 and 22, having armatures 23 and 24, and to drive a rotating exciting generator 25 having an armature 26 and a field winding 27. The prime mover 20 preferably is a 3-phase AC electric motor connected by the electrical cable 18 (shown in FIG. 1) to a commercial AC power line. The armature 23 is connected through conductors 28 to the armature 29 of a hoist motor 30 which drives the hoist cable winding drum 16 (shown in FIG. 1), and the armature 24 is connected through conductors 31 to the armature 32 of a drag motor 33 which drives the drag cable winding drum 17 (shown in FIG. 1). In order to provide control over the hoist motor 30 and the drag motor 33, a hoist motor control 34 is connected to a field winding 35 of the generator 21 and a drag motor control 36 is connected to a field winding 37 of the generator 22.

The motors 30 and 33 also include field windings 38 and 39, respectively, which require DC excitation and are connected through a pair of conductors 40 to the armature 26 of the exciting generator 25. Field resistors 41 and 42 are connected in series with the windings 38 and 39, respectively. Current flow through the field windings 38 and 39, and thus performance of the motors 30 and 33, is subject to undesirable variations in temperature.

In order to compensate for variations in temperature, apparatus including a temperature compensating voltage regulator 43 is provided to regulate and control the output voltage of the exciting generator 25 as a function of motor field winding temperature. A first input of the regulator is adapted to receive a voltage feedback signal for the voltage regulating function of the regulator 43 and is connected through positive and negative conductors 44 and 45 to the armature 26, and thus to the output of the exciting generator 25. A second input of the regulator 43 is adapted to receive a temperature signal for the temperature compensating function of the regulator 43 and is connected through conductors 46 and 47 to a thermistor 48. The thermistor 48 is arranged to sense a temperature representative of the temperature of the motor field windings 38 and 39 and is located in thermal proximity to the exciting generator field winding 27. An output of the regulator 43 is connected through conductors 49 and 50 to the exciting generator field winding 27.

It will be understood that the configuration shown in FIG. 2 is representative only, and that numerous modifications thereof may be made without departing from the true spirit and scope of the invention. For example, the number of generators and motors in the earth excavator may vary. A plurality of exciting generators may be provided, each with its own temperature compensating voltage regulator. The temperature sensing means, while shown as the thermistor 48, could be any element having an electrical output or an electrical property which varies as a function of temperature, such as, but not limited to, a diode, a transistor, a thermocouple or a capacitor. Additionally, to achieve a desired function relating exciting generator output voltage to motor field winding temperature, a plurality of thermistors may be employed, connected in series, in parallel, or in a combination of series and paralle, as is well-known in the art. The thermistor 48 optionally may be physically located in any one of a number of suitable locations. The most accurate temperature compensation would be achieved if the thermistor 48 were placed in thermal proximity to a motor field winding (38, 39). As a practical matter it may be more convenient and entirely satisfactory to place the thermistor 48 in thermal proximity to the exciting generator field winding 27, as in the embodiment shown in FIG. 2. Alternatively, the thermistor 48 could be placed in thermal proximity to a motor-generator set field winding.

Figure 3:
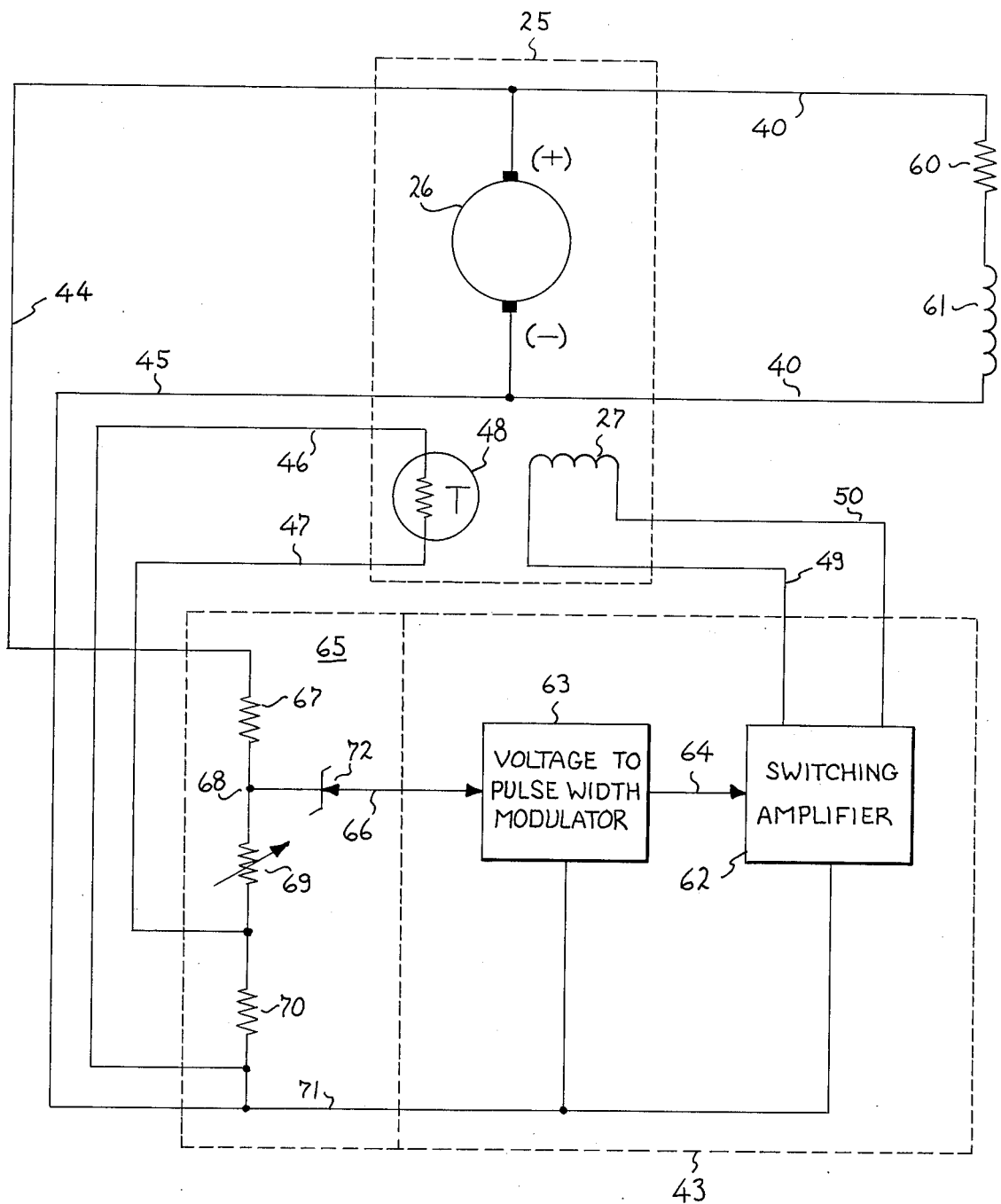
FIG. 3 is a partially schematic block diagram showing the voltage regulating circuitry of the present invention in more detail.

Referring now to FIG. 3, the temperature compensating voltage regulator 43 of FIG. 2 is shown in greater detail. It will be apparent that the embodiment of the regulator 43 shown in FIG. 2 is of the switching type. The armature 26 of the exciting generator 25 is connected through the pair of conductors 40 and a representative field resistor 60 to a representative motor field winding 61 which may, for example, be either or both of the motor field windings 38 and 39 shown in FIG. 2. The regulator 43 includes a switching amplifier 62 with an output connected through the conductors 49 and 50 to the exciting generator field winding 27 and a voltage to pulse width modulator 63 with an output connected through a conductor 64 to an input of the switching amplifier 62. The regulator 43 further includes a conditioning means 65 for receiving and combining a signal representative of exciting generator output voltage and a signal representative of motor field winding temperature to provide a suitable control voltage through a control voltage conductor 66 to the voltage to pulse width modulator 63. The conditioning means 65 has a first input connected through the positive and negative conductors 44 and 45 to the exciting generator armature 26 and has a second input connected through the conductors 46 and 47 to the thermistor 48.

The conditioning means 65 includes a voltage divider comprising an upper fixed resistor 67 connected above a tap point 68 and a variable resistor 69 and a lower fixed resistor 70 serially connected below the tap point 68. The upper terminal of the upper resistor 67 is connected through the positive conductor 44 to the armature 26. The lower terminal of the lower resistor 70 is connected to a common conductor 71. The armature 26 is also connected to the common conductor 71 through the negative conductor 45, so that the entire voltage divider is electrically connected across the armature 26. Additionally, the voltage to pulse width modulator 63 and the switching amplifier 62 are each connected to the common conductor 71.

In order to cause the voltage at the tap point 68 to be an inverse function of sensed temperature, the thermistor 48 is selected to have a negative temperature coefficient and is electrically included in the voltage divider by being connected through the conductors 46 and 47 in parallel with the lower resistor 70. It will be apparent that a similar result could be obtained if the thermistor 48 were selected to have a positive temperature coefficient and was electrically connected above the tap point 68, for example, in parallel with the upper resistor 67.

A Zener diode 72 is connected between the tap point 68 and the control voltage conductor 66 for the purpose of sensing the voltage at the tap point 68 and producing a control voltage which is equal to the amount by which the tap point voltage exceeds a predetermined voltage.

Figure 4A:
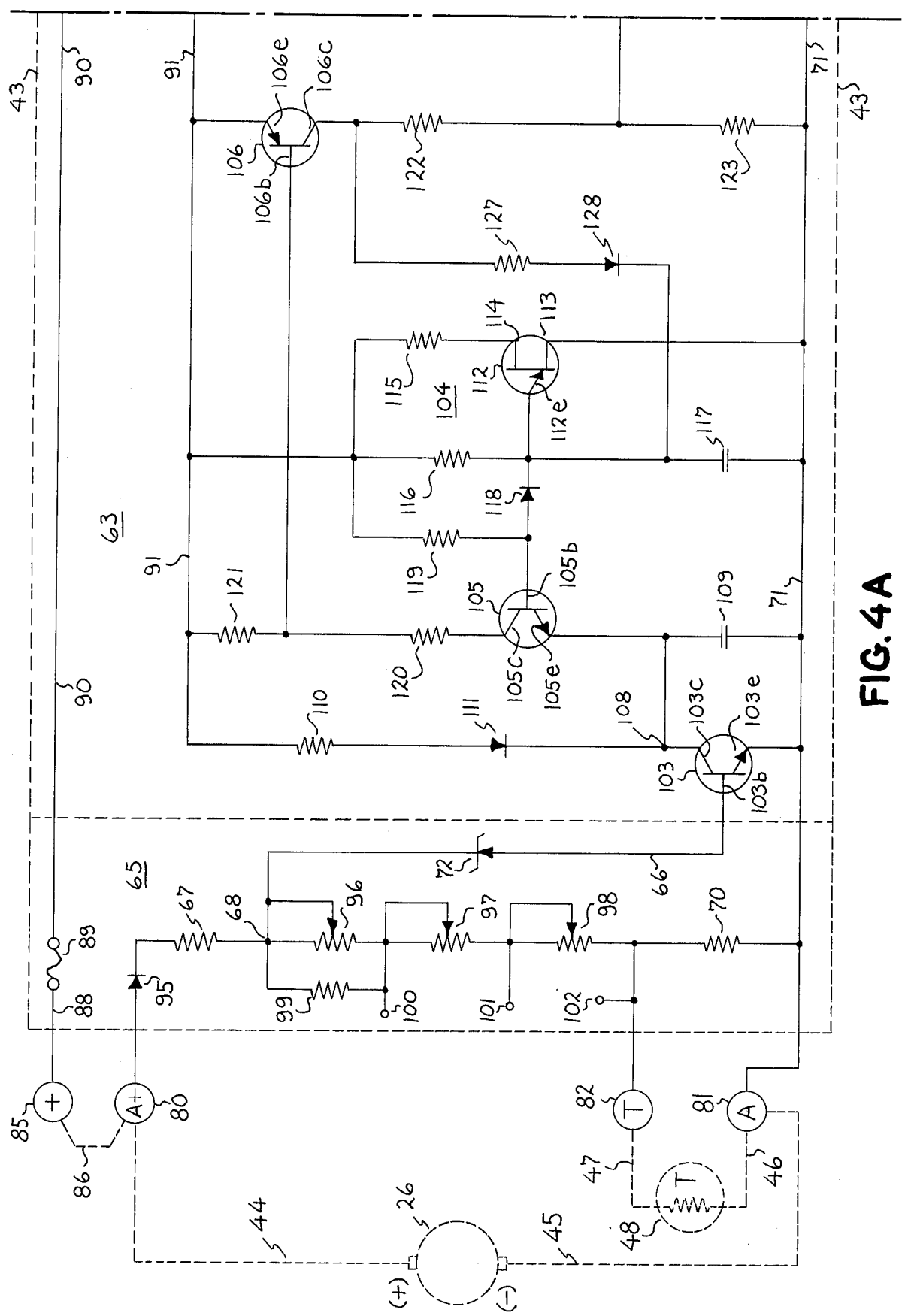
FIGS. 4a and 4b are detailed schematic drawings showing circuitry of a temperature compensating voltage regulator according to the present invention.
Figure 4B:
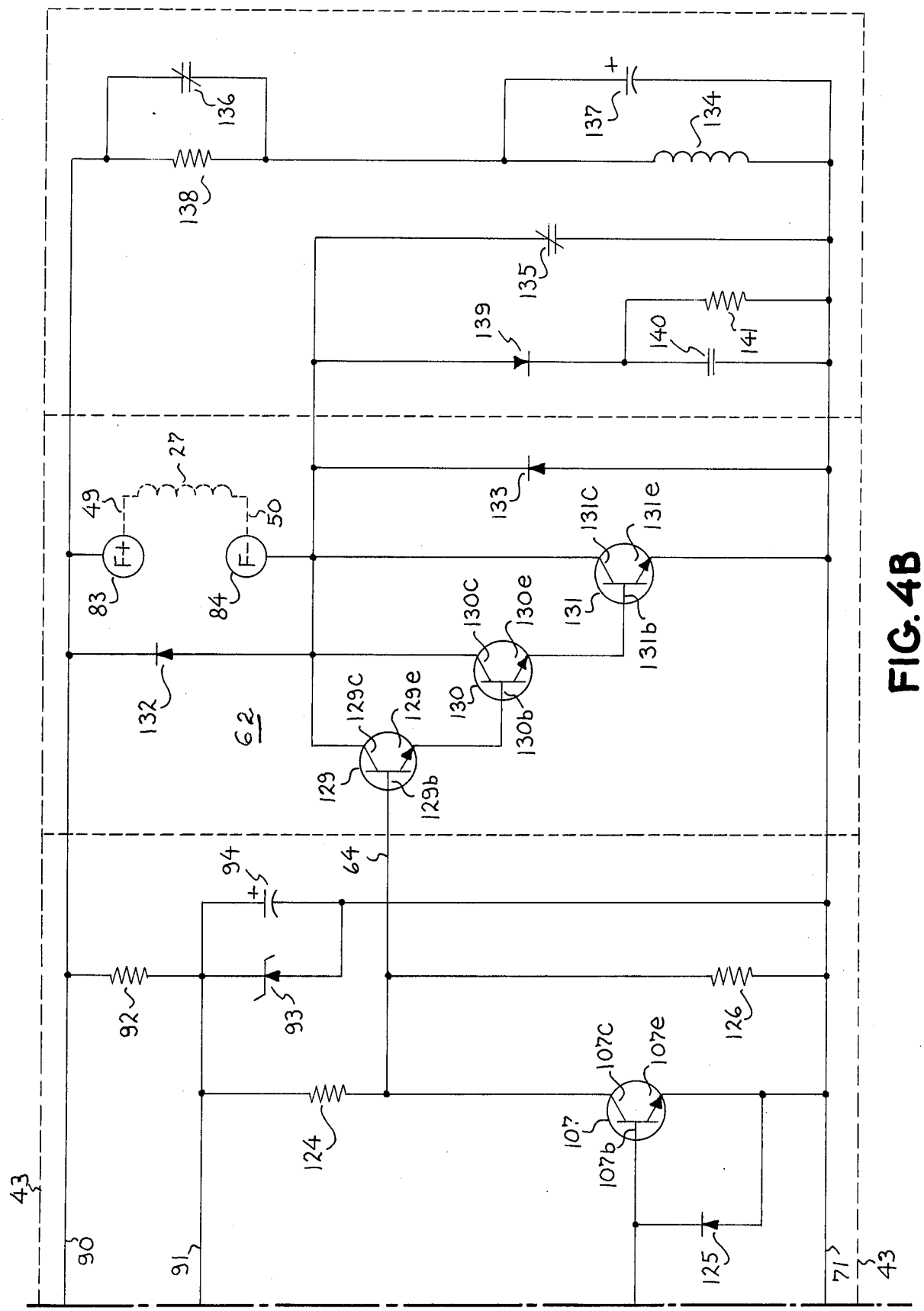

Referring now to FIG. 4, there is shown a detailed schematic diagram of the temperature compensating voltage regulator 43 which is shown in FIG. 2 and 3. The exciting generator armature 26, the thermistor 48 and the generator field winding 27, each shown in broken lines, are physically located externally to and electrically connected to the circuitry of the regulator 43 through various terminals, as will now be described.

In order to provide the voltage feedback signal to the regulator 43, the positive and negative conductors 44 and 45 from the armature 26 are connected to an "A+" terminal 80 and to an "A−" terminal 81, respectively. The thermistor conductor 46 is also connected to the "A−" terminal 81, and the thermistor conductor 47 is connected to a "T" terminal 82. The exciter field winding conductors 49 and 50 are connected to an "F+" terminal 83 and to an "F−" terminal 84, respectively. Additionally, there is provided a "+" terminal 85 for connection to a suitable source for supplying voltage and current to both the circuitry of the regulator 43 and the field winding 27. If the regulator 43 is used to regulate the output voltage of a self-excited exciting generator, a jumper 86, shown as a broken line, is connected between the "+" terminal 85 and the "A+" terminal 80. Alternatively, if the regulator 43 is used to regulate the output voltage of a separately-excited exciting generator, a separate source of voltage and current such as a separate field supply 87 (shown in FIG. 5B) would be connected to the "+" terminal 85, in which case the jumper 86 would not be included. The "+" terminal 85 is connected through a conductor 88 and through an over-current protection fuse 89 to a supply voltage conductor 90. The "A−" terminal 81 is connected to the common conductor 71, which is a common reference for the entire circuit.

Turning now to the internal circuitry of the regulator 43, in order to provide a source of regulated DC voltage, a regulated supply voltage conductor 91 is connected through a voltage dropping resistor 92 to the supply voltage conductor 90 and, through a parallel combination of a Zener diode 93 and a filter capacitor 94, to the common conductor 71. The Zener diode 93 is polarized with its cathode connected to the regulated supply voltage conductor 91.

The "A+" terminal 80 is connected through a reverse voltage blocking diode 95 to a voltage divider comprising the upper fixed resistor 67, series-connected variable resistors 96, 97 and 98, and the lower fixed resistor 70, the externally located thermistor 48 being connected in parallel with the lower resistor 70 through the "T" terminal 82 and the "A—" terminal 81 so it is electrically included in the voltage divider. In order to provide a wider range of adjustment, the single variable resistor 69 (shown in FIG. 3) is replaced in this preferred embodiment by the series-connected variable resistors 96, 97 and 98. Additionally, in order to provide a finer degree of adjustment for the variable resistor 96, a fixed resistor 99 is connected in parallel with the variable resistor 96. In order to provide different ranges of adjustment, option terminals 100, 101 and 102 are connected to selected points on the voltage divider so that one or a plurality of the voltage divider resistors may be shorted out using jumpers (not shown) in a well-known manner. The voltage divider tap point 68 is connected to the control voltage conductor 66 through the Zener diode 72, the cathode of the Zener diode 72 being connected to the tap point 68. The voltage divider and the Zener diode 72 together comprise the conditioning means 65, the control voltage conductor 66 being the output of the conditioning means 65.

The voltage to pulse width modulator 63 comprises an NPN input transistor 103, a free-running sawtooth waveform generator (oscillator) shown generally at 104, an NPN threshold transistor 105, and switching mode amplifying transistors 106 and 107. The base 103b of the input transistor 103 is the input and the collector 107c of the amplifying transistor 107 is the output of the voltage to pulse width modulator 63.

The input transistor 103 is connected in a common-emitter configuration, its emitter 103e being connected to the common conductor 71. The collector 103c of the transistor 103 is connected to a threshold voltage set point 108. A threshold capacitor 109 is connected between the set point 108 and the common conductor 71. In order to provide charging current for the threshold capacitor 109, a charging resistor 110 and a reverse voltage blocking diode 111 are connected in series between the regulated supply voltage conductor 91 and the set point 108.

The free-running sawtooth waveform generator 104 is a well-known unijunction transistor (UJT) relaxation oscillator. The waveform generator 104 comprises a UJT 112 having a base-one 113 which is connected to the common conductor 71 and a base-two 114 which is connected through a resistor 115 to the regulated supply voltage conductor 91. In order to establish a frequency for the waveform generator 104, a timing resistor 116 and a timing capacitor 117 are respectively connected between the emitter 112e of the UJT 112 and the regulated supply voltage conductor 91 and between the emitter 112e and the common conductor 71, in a well-known manner.

In order to compare the voltages on the threshold capacitor 109 and the timing capacitor 117, the emitter 105e of the threshold transistor 105 is connected to the threshold voltage set point 108 and the base 105b of the threshold transistor 105 is connected through a coupling diode 118 to the junction of the emitter 112e, the timing resistor 116, and the timing capacitor 117. The diode 118 is polarized with its anode connected to the base 105b. A biasing resistor 119 is connected between the regulated supply voltage conductor 91 and the base 105b. The collector 105c of the threshold transistor 105 is connected through series-connected load resistors 120 and 121 to the regulated supply voltage conductor 91.

The amplifying transistor 106, of the PNP type, is connected in a common-emitter configuration, its emitter 106e being connected to the regulated supply voltage conductor 91, its base 106b being connected to the junction of the load resistors 120 and 121, and its collector 106c being connected through series-connected load resistors 122 and 123 to the common conductor 71. The amplifying transistor 107, of the NPN type, is also connected in a common-emitter configuration, its emitter 107e being connected to the common conductor 71, its base 107b being connected to the junction of the load resistors 122 and 123, and its collector 107c being connected through a load resistor 124 to the regulated supply voltage conductor 91. In order to protect the transistor 107 from reverse polarity voltage spikes across the base-emitter junction which may result when a circuit to an inductive load is opened, a diode 125 is connected between the base 107b and the emitter 107e. In order to limit the maximum voltage available at the output of the voltage to pulse width modulator 63, a resistor 126 is connected between the collector 107c and the common conductor 71. The resistor 126 cooperates with the load resistor 124 to form a voltage divider. A compensating resistor 127 and a diode 128 are connected in series between the collector 106c and the junction of the timing capacitor 117, the timing resistor 116, and the emitter 112e.

The switching amplifier 62 includes NPN amplifying transistors 129, 130, 131 connected in a Darlington-like configuration. The base 129b of the transistor 129 is the input of the switching amplifier 62 and is connected through the conductor 64 to the collector 107c of transistor 107, the output of the voltage to pulse width modulator 63. The collectors 129c, 130c and 131c of the transistors 129, 130 and 131 are connected to each other and to the "F—" terminal 84. The emitter 129e of the transistor 129 is connected to the base 130b of the transistor 130, the emitter 130e of the transistor 130 is connected to the base 131b of the transistor 131, and the emitter 131e of the transistor 131 is connected to the common conductor 71. The "F+" terminal 83 is connected to the supply voltage conductor 90. A free-wheeling diode 132 is connected between the "F+" terminal 83 and the "F—" terminal 84. In order to protect the entire circuit from an accidental wrong polarity connection at 85, a diode 133 with its cathode connected to the anode of free wheeling diode 132 and its anode connected to the common conductor 71 is included. In the event of an accidental connection of a negative power supply voltage at point 85, current will flow through protection diode 133 through free wheeling diode 132 and through fuse 89 causing the fuse to overload and blow thus protecting the circuit from reverse currents.

To protect the output transistor 131 from spike voltages caused by the rapid switching of the shunt field 27, a spike suppression network is included in the regulator 43. A diode 139 and a voltage spike suppression capacitor 140 are connected in series and across transistor 131c to 131e. A discharging resistor 141 is connected in parallel with the voltage spike capacitor 140.

To provide maximum availabe voltage to the field winding 27 during voltage build-up of the self-excited exciting generator (or generators, in some embodiments), a relay including a coil 134 and normally-closed contacts 135 and 136 is additionally included in the regulator 43. A parallel combination of the relay coil 134 and a capacitor 137 is connected in series with a parallel combination of the normally-closed contacts 136 and a holding current resistor 138 between the supply voltage conductor 90 and the common conductor 71. The normally-closed contacts 135 are connected between the collector 131c and the emitter 131e. The capacitor 137 is charged through normally closed contacts 136 during the initial exciter voltage build up and supplies the power to the coil during the switching operation of the relay to cause the relay to switch completely so only coil holding current through resistor 138 will be needed to maintain open contacts 135 and 136.

The following component values have been found suitable for use in the preferred embodiment of my invention represented by the circuit shown in FIG. 4. These values are exemplary only, and are not intended to limit the scope of the claimed invention.

| Transistors | |
| --- | --- |
| 103, 105, 107 | 2N3417 |
| 106 | 2N4062 |
| 112 | 2N2646 |
| 129, 130 | D42R2 |
| 131 | MJ9000 or GE 36 |
| Diodes | |
| 72, 93 | 22 volt Zener |
| 95, 111, 118, 128, 139 | 1N5059 |
| 125 | 1N5059 |
| 133 | 1N5626 |
| 132 | 1N1206RA |
| Relay | |
| (Winding 134; Contacts 135, 136) | MR105T |
| Thermistor | |
| 48 | D501 National Lead 1000 Ohms at 25° C |
| Fixed Resistors | |
| 67 | 10K ohm |
| 70 | 1.5K ohm |
| 92 | 6.8K ohm |
| 99 | 5.8K ohm |
| 110 | 10K ohm |
| 115 | 270 ohm |
| 116 | 47K ohm |
| 119 | 1 Meg ohm |
| 120 | 22K ohm |
| 121 | 10K ohm |
| 122 | 4.7K ohm |
| 123 | 3.3K ohm |
| 124 | 10K ohm |
| 126 | 6.8K ohm |
| 127 | 1 Meg ohm |
| 138 | 12K ohm |
| 141 | 8.2K ohm |
| Variable Resistors | |
| 96 | 2K ohm |
| 97 | 5K ohm |
| 98 | 25K ohm |
| Capacitors | |
| 51 | 10 mfd. |
| 66 | .22 mfd. |
| 69 | 1 mfd. |
| 91 | 25 mfd. |
| 93 | 1.8 mfd. |
| Fuse | |
| 47 | 8 amps |

Figure 5A:
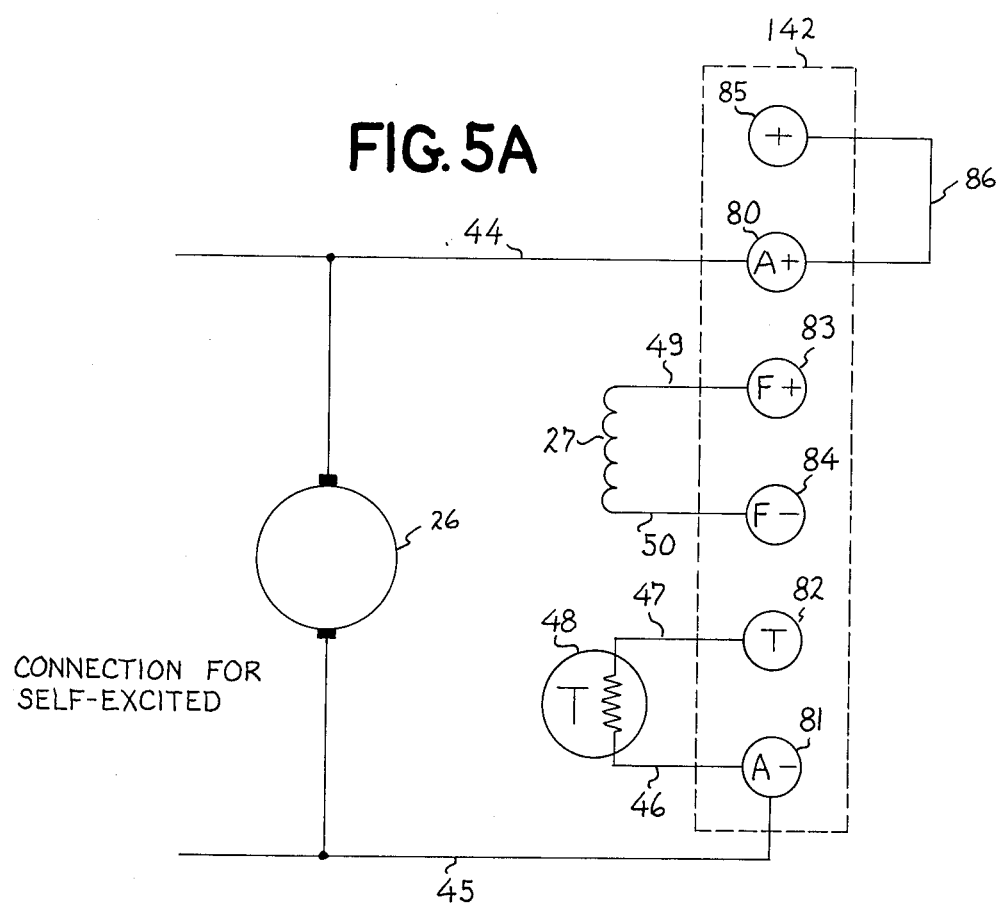
FIG. 5A is a schematic drawing showing connections to the temperature compensating voltage regulator of FIG. 4 when used with a self-excited exciting generator.
Figure 5B:
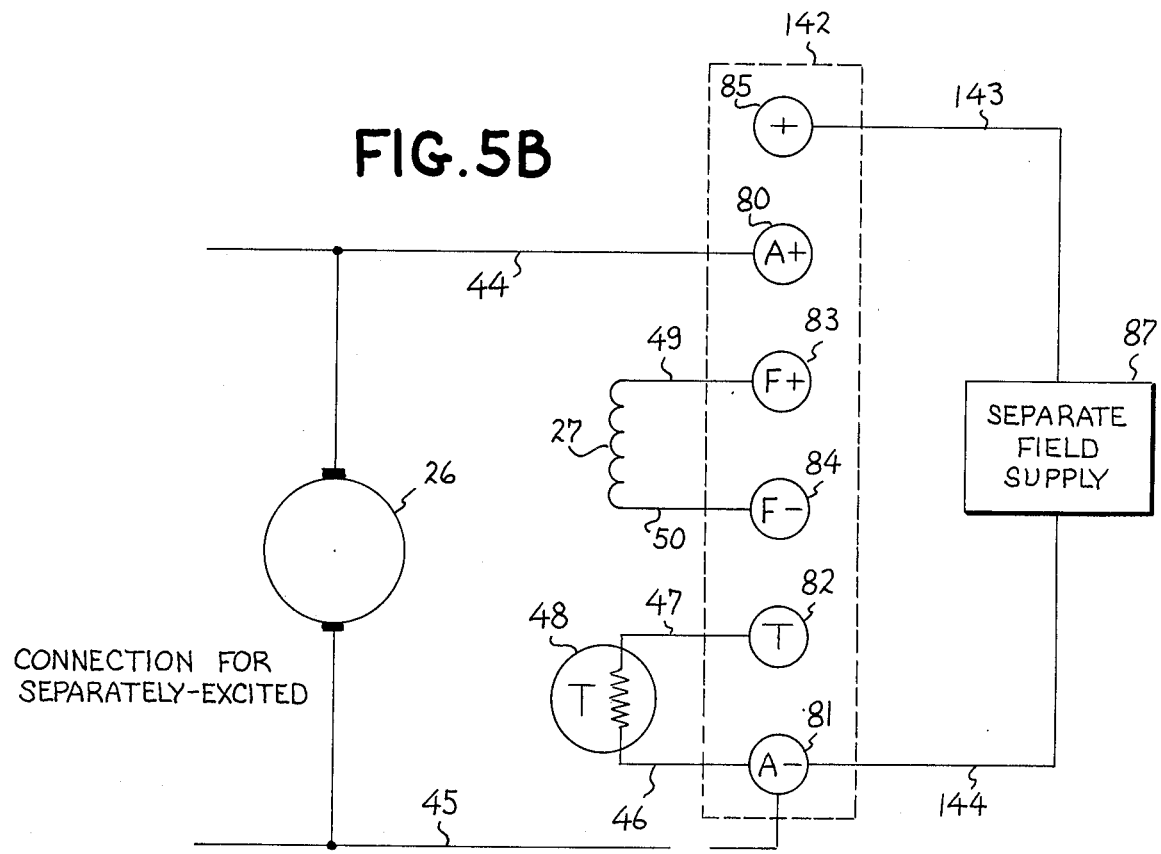
FIG. 5B is a schematic drawing showing connections to the temperature compensating voltage regulator of FIG. 4 when used with a separately-excited exciting generator.

Referring now to FIGS. 5A and 5b, there is shown in greater detail the external conn-ctions to the voltage regulator 43 of FIG. 4. FIGS. 5A and 5B illustrate connections for the use of the regulator 43 with self-excited and separately-excited exciting generators, respectively. In both FIG. 5A and FIG. 5B, there is shown in broken lines an insulated terminal block 142 that supports the various terminals used for making connections to the armature 26, the thermistor 48, and the exciting generator field winding 27, which have been discussed above with reference to FIG. 4.

Referring to FIG. 5A, a jumper 86 is connected between the "A+" terminal 80 and the "+" terminal 85. Referring to FIG. 5B, the separate field supply 87 is connected through a positive conductor 143 to the "+" terminal 85 and through a negative conductor 144 to the "A−" terminal 81. The jumper 86 (shown in FIG. 5A) is not used in the arrangement of FIG. 5B.

Figure 6:
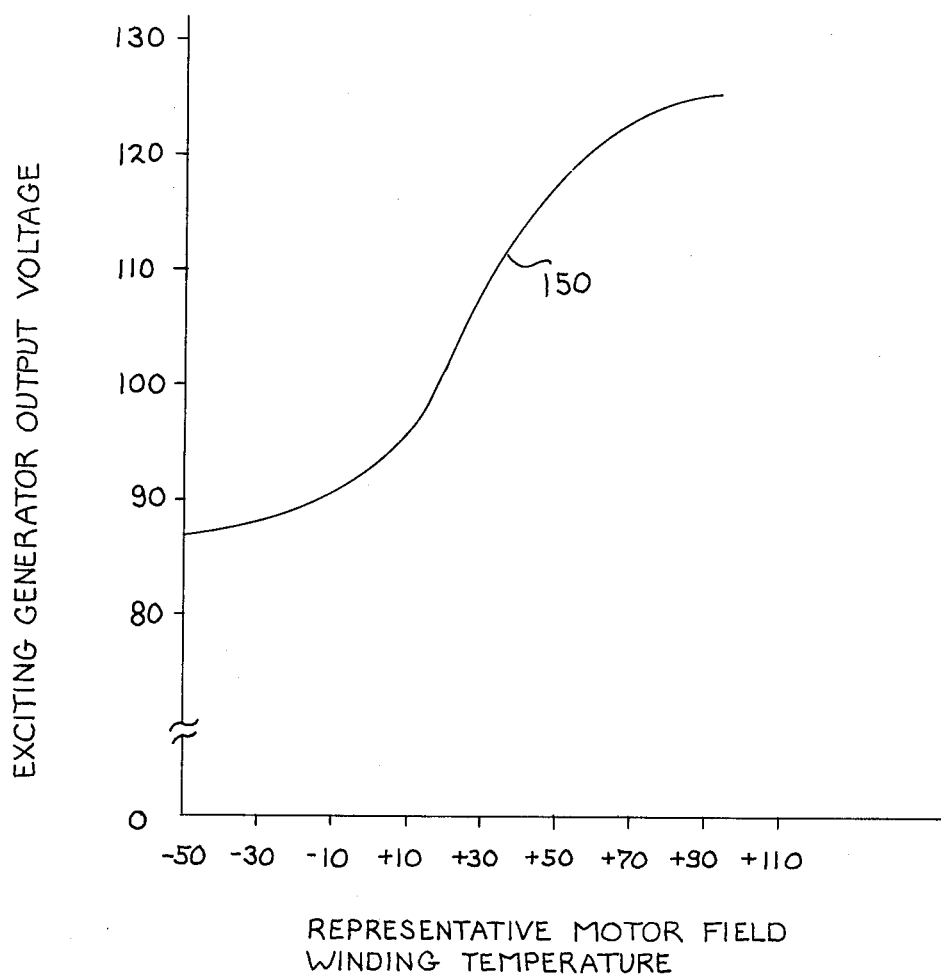
FIG. 6 graphically illustrates a typical temperature compensating characteristic curve of the invention.

Referring now to FIG. 6, there is shown, by way of example, a characteristic curve 150 relating representative motor field winding temperature to the magnitude of exciting generator output voltage required to effect compensation and thereby to stabilize excavator performance by maintaining motor field winding current substantially constant despite variations in motor field winding temperature. As can be seen from the curve 150, the output voltage of the exciting generator 25 (shown in FIGS. 2 and 3) is caused by application of the compensating apparatus of the invention to vary as a direct function of representative motor field winding temperature. The characteristic curve 150 is representative only. A particular excavator may require a different characteristic curve to achieve suitable compensation. Different characteristic curves may be achieved through proper adjustment of the regulator 43 (shown in FIGS. 2, 3 and 4).

Having described a preferred embodiment of the invention, its operation will now be explained.

The electrical resistance of the motor field windings 38 and 39 (FIG. 2) is a direct function of motor field winding temperature and therefore varies as motor field winding temperature varies. The current through each of the motor field windings 38 and 39 is directly proportional to voltage supplied by the exciting generator 25 and inversely proportional to the total resistance in the circuit including the motor field winding(s). Further, the performance of each of the motors 30 and 33 is dependent upon the current flowing through the corresponding motor field windings 38 and 39. Thus, the performance of the motors 30 and 33 and therefore of the dragline 10 (FIG. 1) is subject to undesirable variations as a result of the wide variations in temperature under which the excavator 10 may be required to operate.

In order to maintain the current generally constant through each of the motor field windings 38 and 39, and thus maintain the performance of the motors 30 and 33 and of the excavator 10, substantially constant despite variations in the temperature of the motor field windings 38 and 39, the temperature compensating voltage regulator 43 regulated the output voltage of the exciting generator 25 as a direct function of the temperature sensed by the thermistor 48, the sensed temperature being representative of motor field winding temperature. The regulator 43 may be considered a conventional voltage regulator of the voltage feedback type for holding the output voltage of the exciting generator 25 at a predetermined voltage, but including provision for varying the predetermined voltage as a direct function of sensed temperature. Control of the exciting generator output voltage is achieved by controlling the current supplied to the field winding 27 of the exciting generator 25.

Referring to FIG. 3, the operation of a general embodiment of the present invention will now be explained. The conditioning means 65 combines a signal representative of the voltage across the exciter armature 26 and a signal representative of the temperature sensed by the thermistor 48 to produce a control voltage on the control voltage conductor 66. In the illustrated embodiment, the magnitude of the control voltage is a direct function of exciting generator armature (output) voltage and an inverse function of representative motor field winding temperature. It will be apparent that the voltage produced at the voltage divider tap point 68 is less than, but a direct function of, the voltage across the armature 26. If the resistance of the thermistor 48 were to remain constant, the voltage on the tap point 68 would be proportional to the armature voltage. Similarly, it will be apparent that the voltage produced on the tap point 68 is a direct function of the resistance of the thermistor 48 because the thermistor 48 is connected below the voltage divider tap point 68. Since the thermistor 48 has a negative temperature coefficient, the tap point voltage is an inverse function of the temperature sensed by the thermistor 48. The Zener diode 72 senses the voltage on the tap point 68 and produces the control voltage on the control voltage conductor 66. The control voltage is less than the voltage on the tap point 68 by an amount equal to the breakdown voltage of the Zener diode 72.

The voltage to pulse width modulator 63 is conventional in operation and produces at its output, on the conductor 64, a repetitive pulse signal having a substantially constant repetitive rate and a duty cycle which is substantially inversely proportional to the magnitude of the control voltage. The repetitive pulse signal produced by the voltage to pulse width modulator is carried by the conductor 64 to the input of the switching amplifier 62. The switching amplifier 62 is a high speed switch which energizes the exciting generator field winding 27 in response to the repetitive pulse signal. Since the voltage to pulse width modulator 63 produces pulses having a duty cycle which is substantially inversely proportional to the magnitude of the control voltage, it will be apparent that the duty cycle in an inverse function of exciting generator armature (output) voltage and a direct function of representative motor field winding temperature.

The output voltage produced by the armature 26 of the exciting generator 25 is a direct function of the average current flowing through the exciting generator field winding 27. The average current flowing through the exciting generator field winding 27 is a direct function of the duty cycle of the repetitive pulse signal produced by the voltage to pulse width modulator 63. Therefore, the regulated output voltage of the exciting generator 25 is a direct function of the temperature sensed by the thermistor 48.

Referring to FIG. 4, the operation of one embodiment of the temperature compensating voltage regulator 43 will now be explained in greater detail.

The operation of the conditioning means 65 was explained above with reference to FIG. 3. The embodiment of the conditioning means 65 shown in FIG. 4 includes several additional components to permit a wider range of adjustment and to permit the regulator 43 to be applied to a variety of exciting generators, but its operation is the same as the operation of the embodiment shown in FIG. 3.

Continuing with the operation of the embodiment of the regulator 43 shown in FIG. 4, the waveform generator 104 included in the voltage to pulse width modulator 63 operates to produce a signal having an approximate sawtooth waveform at the emitter 112e. At the beginning of an operation cycle, the timing capacitor 117 is discharged and the emitter 112e is reverse-biased and therefore non-conducting. As the timing capacitor 117 is charged through the timing resistor 116 and additionally through the biasing resistor 119 and the coupling diode 118, as described in greater detail below, the UJT 112 emitter voltage rises exponentially toward the voltage on the regulated supply voltage conductor 91. When the UJT 112 emitter voltage reaches the peak point emitter voltage ($V_p$) of the UJT 112, the emitter 112e becomes forward-biased, the resistance between the emitter 112e and base-one 113 drops to a low value, and the timing capacitor 117 then rapidly discharges through the emitter 112e. When the timing capacitor 117 discharges sufficiently so that the UJT 112 emitter voltage reaches the valley voltage ($V_v$) of the UJT 112, the emitter 112e becomes reverse-biased and the cycle begins again.

The input transistor 103 included in the modulator 63 operates as a variable resistor, its collector-emitter junction resistance being determined by the control voltage applied to the base 103b. The threshold capacitor 109 is charged through the charging resistor 110 and the blocking diode 111 from the voltage available at the regulated supply voltage conductor 91, and is discharged through the collector-emitter junction of the input transistor 103. When the voltage at the base 103b is zero, the input transistor 103 is completely cut off, allowing the threshold capacitor 109 to charge up to the voltage present on the regulated supply voltage conductor 91. As the voltage supplied to the base 103b varies, the collector-emitter junction of the input transistor 103 conducts in varying degrees, thus varying the charge on the threshold capacitor 109 and the voltage at the threshold voltage set point 108.

The threshold transistor 105 and the coupling diode 118 cooperate to compare the voltages on the threshold capacitor 109 and the timing capacitor 117, the voltage on the timing capacitor 117 being the emitter voltage of the UJT 112. When the voltage on the threshold capacitor 109 exceeds the voltage on the timing capacitor 117, the coupling diode 118 is forward-biased and the base-emitter junction of the threshold transistor 105 is reverse-biased. In addition to the charging current flowing through the timing resistor 116, current flows from the regulated supply voltage conductor 91, through the biasing resistor 119 and the coupling diode 118 to charge the timing capacitor 117. Since the base-emitter junction of the threshold transistor 105 is reverse-biased, the transistor 105 is not conducting. The amplifying transistors 106 and 107 are also biased into non-conduction.

When the voltage on the timing capacitor 117 exceeds the voltage on the threshold capacitor 109, the coupling diode 118 is reverse-biased and the base-emitter junction of the threshold transistor 105 is forward-biased. Since the coupling diode 118 is reverse-biased, no current flows from the regulated supply voltage conductor 91, through the resistor 119 and the coupling diode 118 to charge the timing capacitor 117. The threshold transistor 105 is conducting because its emitter-base junction is forward-biased, the amplifying transistor 106 is biased into conduction by the voltage appearing across the load resistor 121, and the amplifying transistor 107 is biased into conduction by the voltage appearing across the load resistor 123. Additionally, since the transistor 106 is conducting, in addition to the charging current flowing through the timing resistor 116, current flows from the regulated supply voltage conductor 91, through the emitter-collector junction of the transistor 106, the compensating resistor 127, and the diode 128 to charge the timing capacitor 117. The coupling diode 118 and the biasing resistor 119 are required to bias the threshold transistor 105 into conduction, but they also provide an alternate charging path to the timing capacitor 117. Since the timing capacitor 117 is charged through the resistor 119 and the diode 118 during only part of the cycle, the charging rate of the timing capacitor 117, and thus the frequency of the waveform generator 114, would vary with changes in the output duty cycle unless compensation were provided. The compensating resistor 127 and the diode 128 provide the necessary compensation.

Since the voltage at the threshold voltage set point 108 is determined by the voltage on the base 103b, signal pulses at the collector 105c have a substantially constant repetition rate (determined by the frequency of the waveform generator 104) and a width, or duty cycle, dependent upon the voltage carried by the control voltage conductor 66 to the base 103b. The signal pulses at the collector 105c are amplified by the transistors 106 and 107 to produce an output pulse signal of square waveform on the conductor 64.

The switching amplifier 62, including the transistors 129, 130 and 131, is a high speed switch which energizes the field winding 27 in response to the repetitive pulse signal produced by the voltage to pulse width modulator 63 on the conductor 64.

Considering now the operation of the switching amplifier 62, when the transistor 107 in the voltage to pulse width modulator 63 is not conducting, the voltage on the conductor 64 is at some positive value, determined by the voltage on regulated supply voltage conductor 91, the resistance of the resistors 124 and 126, and the forward-biased base-emitter voltages of the transistors 129, 130 and 131. The voltage on the conductor 64 biases the transistors 129, 130 and 131 into conduction. Current flows from the supply voltage conductor 90, through "F+" terminal 83, through the exciting generator field winding 27, through the "F−" terminal 84, and through the collector-emitter junction of the transistor 131 to the common conductor 71, thereby energizing the field winding 27.

When the transistor 107 in the voltage to pulse width modulator 63 is conducting, the voltage on the conductor 64 is near the reference voltage on the common conductor 71. The transistors 129, 130 and 131 are biased into non-conduction and no current is supplied to the field winding 27 from the supply voltage conductor 90.

The free-wheeling diode 132 provides a circuit for induced voltage and current which are produced by the field winding 27 due to its inductive character. When the transistor 131 is initially turned off, current is no longer supplied to the field winding 27 and its magnetic field collapses, inducing voltage and current, the current flowing through the free-wheeling diode 132. When the transistor 131 is conducting and voltage and current is being supplied to the field winding 27 from the supply voltage conductor 90, the free-wheeling diode 132 is reverse-biased and no current flows through it.

It will now be apparent that there has been described an earth excavator 10 which includes apparatus for stabilizing performance by regulating the output voltage of the exciting generator 25 in a manner such that the regulated voltage supplied by the exciting generator 25 to the motor field windings 38 and 39 varies as a direct function of the temperature of the motor field windings 38 and 39. The compensating apparatus includes the temperature compensating voltage regulator 43 which receives a voltage feedback signal from the output of the exciting generator 25 and which receives a temperature signal from the thermistor 48. The output of the regulator 43 supplies excitation current to the exciting generator field winding 27 to control the output voltage of the exciting generator 25.

If the regulator 43 is used with a self-excited exciting generator, such as the generator 25 (FIG. 3), when the generator 25 is started, the initial armature voltage and thus the initial voltage on the supply voltage conductor 90 is zero, and the field winding 27 is de-energized. Before the field winding 27 is sufficiently energized, the generator 25 must depend upon residual magnetism in the field to generate an output voltage. This residual magnetism may not be sufficient to permit the generator output voltage to build up to a high enough voltage to operate the circuitry of the regulator 43. In that event, transistor 131 would not conduct, the field winding 27 might never be energized and the exciting generator 25 would never produce a usable output.

In order to permit the regulator 43 to be used with self-excited exciting generators, the relay including the coil 134 and the normally-closed contacts 135 and 136 is included. While the armature voltage builds up, the field winding 27 is effectively connected directly across the armature 26 through a circuit including the jumper 86, the supply voltage conductor 90, the "F+" terminal 83, the "F−" terminal 84, the normally-closed relay contacts 135 and the common conductor 71. This provides maximum available voltage to the field winding 27. When the armature voltage and thus the voltage on the supply voltage conductor 90 reaches a predetermined value, for example, 30 volts, the current through the normally-closed relay contacts 136 and the relay coil 134 is sufficient to energize the relay. When the relay is energized, the normally-closed contacts 135 open, thereby permitting the circuitry of the regulator 43 to begin controlling the voltage and current supplied to the field winding 27. Additionally, the normally-closed contacts 136 connected in parallel with the holding current resistor 138 open, permitting current supplied to the relay coil 134 to flow through the resistor 138. Sufficient current flows through the resistor 138 to hold the relay in its energized position.

The diode 139, the capacitor 140 and the resistor 141 form a voltage spike suppression network. This network is necessary to reduce the voltage spike across transistors 129, 130 and 131 when they turn off at the end of each conducting cycle. When transistor 131 is turned off the inductance of the shunt field 27 causes the collector voltage of 129, 130 and 131 to increase rapidly until it reaches a value high enough to cause diode 132 to be forward-biased and turn on. Due to the very short turn off time of transistor 131 (approximaterly 22 micro seconds) and due to the time required to turn on even a high speed diode 132 a voltage spike approximately 10 micro seconds in duration and 100 volts in magnitude above the supply voltage was measured in the absence of the suppression circuit. The addition of the spike suppression circuit, pursuant to the teaching of the invention, reduced the spike magnitude to 5 to 10 volts. The suppression circuit operates in the following manner.

When transistor 131 is turning off the voltage at its collector starts increasing. When it reaches a voltage slightly higher than the charge on capacitor 140 diode 139 starts to become forward-biased and will be turned full on by the time the voltage reaches the supply voltage. The spike voltage is thus fed into capacitor 140. When transistor 131 is turned off the voltage at its collector is low and the voltage on the capacitor 140 is bled off through resistor 141 to a low enough voltage to allow a repeat cycle. Since the charge on capacitor 140 is considerably below the supply voltage the diode 139 can start to be forward biased before the voltage at the collector of transistor 131 reaches the value of the supply voltage and will be conducting by this time and will conduct long enough to allow diode 132 to turn on thus reducing the spike to insignificance. While the invention has been particularly shown and described with reference to one embodiment thereof, it will be understood by those skilled in the art that various changes in form, details and application may be made therein without departing from the true spirit and scope of the invention. For example, it has been pointed out above that the temperature sensing means may be other than the thermistor 48 illustrated. The voltage regulating circuitry may be other than that described, for example, a dissipation, rather than a switching regulator may be used to control the voltage and current supplied to the field winding 27. Accordingly, it is intended that all such modifications and changes be included within the scope of the appended claims.

What is claimed as the invention is:

1. In an earth excavator of the type whose performance is subject to undesirable variations as a result of wide variations in temperature under which the excavator may be operated, the excavator including a movable earth excavating component and a direct current electric motor for providing motive power for the component, the electric motor having a field winding, the electrical resistance of the motor field winding being a direct function of the temperature of the motor field winding, thereby causing the performance of the motor and thus of the excavator to vary with variations in the current flowing through the motor field winding, and the excavator further including an exciting generator for supplying voltage and current to the motor field winding;

the improvement wherein said excavator further includes apparatus for stabilizing performance of the excavator by compensating for variations in temperature, said apparatus comprising:

a. means for sensing output voltage of the direct current exciting generator and for providing a first signal representative thereof;

b. means for sensing a temperature representative of the temperature of the motor field winding and for providing a second signal representative thereof; and c. a temperature compensating voltage regulator comprising:
 i. first input means for receiving the first representative signal;
 ii. second input means for receiving the second representative signal;
 iii. means for combining the first and second signals to produce a third signal as an inverse function of the first signal and a direct function of the second signal; and
 iv. output means for supplying excitation current to a field winding of the exciting generator in response to the third signal;

whereby the magnitude of regulated voltage supplied by the exciting generator to the motor field winding is directly related to the temperature of the motor field winding, thereby maintaining current supplied to the motor field winding and therefore the performance of the excavator substantially constant despite variations in the temperature of the said motor field winding.

2. The earth excavator of claim 1, wherein said means for sensing a temperature is disposed in effective thermal proximity to the field winding of the exciting generator.

3. The earth excavator of claim 1, wherein said means for sensing a temperature is a thermistor.

4. The earth excavator of claim 3 wherein said means for combining includes a conditioning means comprising:
 a. a voltage divider including:
  i. an intermediate tap point;
  ii. first and second terminals for connection to said first input means;
  iii. a resistor connected between said tap point and said first terminal; and
  iv. means for connecting said tap point and said second terminal to said second input means so as to electrically include said thermistor in said voltage divider; and
 b. means for producing a voltage at a conditioning means output which is equal to the amount by which the voltage at said tap point exceeds a predetermined voltage.

5. The earth excavator of claim 4, wherein said thermistor has a negative temperature coefficient; said first terminal is connected to a first output terminal of the direct current exciting generator;

said second terminal is connected to a second output terminal of the direct current exciting generator and to a circuit common conductor.

6. The earth excavator of claim 4, wherein said means for combining further comprises:
 a. a voltage to pulse width modulator for producing repetitive pulses having a duty cycle which is a function of the output voltage of the conditioning means; and
 b. a switching amplifier connected to the output of the voltage to pulse width modulator to supply current pulses to the direct current exciting generator field winding in response to the repetitive pulses.

7. In an earth excavator of the type defined in claim 1 including a voltage spike suppression network (139, 140 and 141) electrically connected across the collector and emitter of at least one transistor (131), said collector (131c) being electrically connected to an inductive load

(27) and a diode (132) connected in parallel with said load, said transistor being operable to turn off in a relatively short time compared to the time required to turn on said diode (132), said voltage suppression network comprising a capacitor (140) parallel connected with a resistor (141) and series connected with a diode (139).

8. In an earth excavator of the type defined in claim 7 said transistor (131) and diode (132) being operable to allow a voltage to rise across capacitor (140) for approximately 10 micro seconds after the transistor (131) turns off and before the diode (132) turns on.

* * * * *